(12) United States Patent
Kodialam et al.

(10) Patent No.: US 6,321,271 B1
(45) Date of Patent: Nov. 20, 2001

(54) CONSTRAINED SHORTEST PATH ROUTING METHOD

(75) Inventors: Muralidharan Sampath Kodialam, Marlboro; Wing Cheong Lau; Anlu Yan, both of Eatontown, all of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/218,576

(22) Filed: Dec. 22, 1998

(51) Int. Cl.[7] .......................... G06F 15/173; H04L 12/28

(52) U.S. Cl. ........................... 709/241; 709/244; 370/351

(58) Field of Search .................................... 709/238, 241, 709/244; 370/351, 255; 710/131; 379/220.01, 221.06

(56) References Cited

U.S. PATENT DOCUMENTS

| | | | | |
|---|---|---|---|---|
| 5,317,566 | * | 5/1994 | Joshi ..................................... | 370/238 |
| 5,430,727 | * | 7/1995 | Callon .................................. | 370/401 |
| 5,548,581 | * | 8/1996 | Makrucki .............................. | 370/232 |
| 5,561,790 | * | 10/1996 | Fusaro .................................. | 395/500 |
| 5,596,719 | * | 1/1997 | Ramakrishnan et al. ............ | 709/241 |
| 5,668,800 | * | 9/1997 | Stevenson ............................ | 370/248 |
| 5,754,543 | * | 5/1998 | Seid ...................................... | 370/351 |
| 5,831,982 | * | 11/1998 | Hummel ............................... | 370/396 |
| 5,933,425 | * | 8/1999 | Iwata .................................... | 370/351 |
| 5,995,503 | * | 11/1999 | Crawley et al. ...................... | 370/351 |
| 6,038,509 | * | 3/2000 | Poppen et al. ........................ | 701/210 |
| 6,055,561 | * | 4/2000 | Feldman et al. ..................... | 709/200 |
| 6,147,969 | * | 1/2000 | Benmohamed et al. ............. | 370/230 |
| 6,256,295 | * | 7/2001 | Callon .................................. | 370/254 |

OTHER PUBLICATIONS

Ahuja et al. "Fater Algorithms for the Shortest Path Problem", JACM, vol. 37.2, pp. 213–223, Apr. 1990.*

Orda et al. "Shortest–Path and Min.–Delay Algorithm in Networks with Time–Dependent Edge–Length", JACM, vol. 37.3, pp. 607–625, Jul. 1990.*

Solka et al. "Fast Computation of Optimal Paths using a Parallel Dijkstra Algorithm with embedded Constrainst" Elsevier SBV, vol. 8, pp. 195–212, 1995.*

Parsa, M, et al: "An Iterative Algorithm for Delay–Constrained Minimum–Cost Multicasting," IEEE/ACM Transactions on Networking, vol. 6, No. 4 Aug. 1998, pp. 461–474.

Logothetis, D., et al.,: "Delay sensitive routing in PNNI–based ATM networks" IEEE Globecom 1998, Sydney, Australia, Nov. 8–12, 1998, pp. 604–612.

Widyono, R.: "The design and evaluation of routing algorithms for real–time channels," Internet Article, 'oNLINE!, Jun., 1994, pp. 1–37 (no page 2 available); retrieved from <URL: ftp://ftp.icsi.berkeley.edu/pub/techreports/19994/tr–94–024.ps.gz>.

* cited by examiner

*Primary Examiner*—Zarni Maung
*Assistant Examiner*—Jason D. Cardone
(74) *Attorney, Agent, or Firm*—William Ryan

(57) ABSTRACT

A real-time method for routing subject to an acceptable delay constraint between nodes in high-speed data networks, such as PNNI protocol networks, uses an illustrative two-phase algorithm employing Dijkstra's algorithm at each phase. In an illustrative first phase, the Dijkstra SPF algorithm is used in seeking the shortest cumulative delay from the destination to the source, thereby generating cumulative delay labels from a node j to the destination node k. The delay results are then employed in the second phase, where the Dijkstra SPF algorithm is illustratively employed for determining administrative weight (AW) as the link metric subject to modification in accordance with results obtained in the first phase.

13 Claims, 1 Drawing Sheet

CONSTRAINED SHORTEST PATH ROUTING METHOD

FIELD OF THE INVENTION

The present invention relates to methods and systems for routing data paths in highspeed data networks. More particularly, the present invention relates to methods and systems for selecting preferred routing paths in such networks employing private network node interface (PNNI) protocols.

BACKGROUND OF THE INVENTION

High capacity data networks, such as those using high-speed asynchronous transfer mode (ATM) switches offer promise not only of high-speed data delivery, but also a variety of quality of service (QoS) guarantees. An important element of establishing paths interconnecting nodes in a such high-speed data networks is an efficient, reliable routing mechanism.

Recently, the ATM Forum has standardized on certain PNNI protocols. As defined, these protocols provide for signaling and routing protocols that permit connection setup and release with multiple QoS parameters between nodes. These protocols also provide for exchange of topology state information between nodes. See further, *Traffic Management Specification*, Version 4.0, ATM Forum af-tm-0056.000, April, 1996; and *Private Network-Network Interface Specification Version* 1.0 (*PNNI* 1.0), af-pnni-0055.000, March 1996.

Many implementations of the PNNI protocols have been proposed, with a variety of performance and QoS features. An important consideration in many networks, such as those using the PNNI protocols, is interconnecting desired nodes while employing a minimum of network resources. In particular, it is desired to interconnect nodes using the shortest interconnecting paths. Additionally, it has become ever more important—especially for many time-dependent applications (such as multimedia applications)—to seek to achieve low or minimum delay time for transmission between selected nodes. QoS criteria based on such reduced or minimum delay are therefore of great importance for critical applications, and provide important competitive differentiation for service providers.

There are many solutions for selecting the shortest path (or minimum defined cost) between selected nodes, even in a network having a large number of interconnected nodes. Prominent among these shortest path algorithms is the well-known Dijkstra algorithm. Solutions based on the Dijkstra and other algorithms may often be modified to permit the inclusion of certain conditions relating to various QoS criteria. Experience with Dijkstra algorithm solutions and corresponding coding implementations have proven reliable in many cases and have been adopted for real-time network implementations. It is desirable, therefore, to reuse existing code and maintain functional compatibility between delay-constrained solutions and existing shortest path implementations. As is well known in the art, however, network solutions of the shortest path problem subject to an additive delay condition is a so-called "NP hard" problem that proves intractable in real-time network contexts using current implementation technologies.

SUMMARY OF THE INVENTION

The limitations of the prior art are overcome and a technical advance is made in the network routing arts in accordance with illustrative embodiments of the present invention, as described in the following detailed description.

In accordance with an illustrative embodiment of the present invention, determinations are made at a source node in a network of the short weight paths to each other node in the network, subject to satisfying an acceptable delay constraint. Advantageously, these determinations are performed in a two-phase method employing a modified Dijkstra's algorithm at each phase.

In an illustrative first phase, the Dijkstra SPF algorithm is used in seeking the shortest cumulative delay from the destination to the source, thereby generating cumulative delay labels from a node j to the destination node k. The delay results are then employed in the second phase, where the Dijkstra SPF algorithm is illustratively employed for determining administrative weight (AW) as the link metric subject to modification in accordance with another aspect of the present invention. More specifically, in an illustrative embodiment it proves advantageous to (i) label a node i with cumulative AW from the source node, (ii) track cumulative delay ($D_{s,i}$) from the source during forward AW labeling, and (iii) labeling neighboring nodes j of a permanently labeled node i only if ($D_{s,i}+d_{j,k}+\delta_{i,j}$) is less than the specified end-to-end delay constraint (where $\delta_{i,j}$ is the delay for the link between nodes i and j).

BRIEF DESCRIPTION OF THE DRAWING

The present invention as described in illustrative embodiments in the following detailed description and in the attached drawing, wherein.

DETAILED DESCRIPTION

Figure 1:
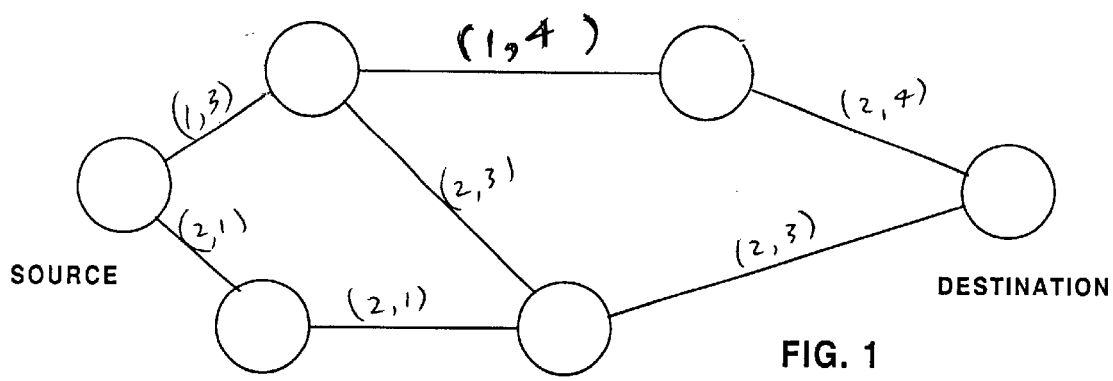
FIG. 1 shows an example network for illustrating an illustrative embodiment of the present invention.

FIG. 1 shows an illustrative network of nodes corresponding, for example, to the nodes in an ATM network. Each source (originating) node includes a control processor for receiving network node state information (as is well-known) and determining a low-cost or near-optimum shortest path analysis, subject to a maximum cumulative delay constraint. Costs are illustratively measured, in part, in terms of administrative weight (AW). Additionally, in an accordance with another aspect of the present invention, costs are also measured, in part, in terms of link delay. Initially, the present discussion proceeds in terms of a single source seeking a low-cost routing to a single destination (unicast operation). Single-source, multi-destination (multicast) operation will be discussed below.

Routing is performed, for a given call, at the source or on behalf of the source by an associated separate or shared processor. In accordance with PNNI protocols, link state parameters communicated between the nodes are of two types: link metrics and link attributes. A link metric is a state parameter for a link, which parameter is a combination of all link parameters along a given path. Thus, such a link metric can indicate whether a particular path is acceptable for a given connection. A link attribute, on the other hand, is a link state parameter that reflects the state of a given link in a path. Path delay is a link metric suitable for use in path weight determinations in accordance with one aspect of the present invention (rather than AW). Path delay is taken as the sum of the delay of all of the links in a path. Received path delay information from other network nodes is advantageously stored in table form at a node processor.

Model

It proves useful to more precisely characterize network routing solutions in terms of a network model. For this purpose, let G=(V, E) represent a directed graph representation of a network. We assume that there are n nodes and m arcs in the tree. Let s∈V represent the source and t represent the destination. Let (i, j)∈E denote a directed edge (arc) in the graph. Let $w_{ij} \geq 0$ represent the weight of arc (i, j) and $d_{ij}>0$ represent the delay incurred along arc (i, j). Let P(i, k) represent the set of simple paths from node i to node k. The weight of a path P∈P(i,k), denoted by w(P), is defined as the sum of the weight of the arcs in the path. The delay of a path P∈P(i, k), denoted by d(P), is the sum of the delay of the arcs in the path. The objective of the routing problem is to find the path of minimum weight from source s to destination t such that the delay of that path is less than some pre-specified value D, i.e., $$\min_{P \in P(s,t)} w(P)$$

subject to $$d(P) \leq D.$$

As noted above, this problem is NP-hard. Next, we develop a heuristic algorithm that seeks to minimize the weight of the path while avoiding violating the delay constraints. We show that the algorithm always terminates with a feasible path (with respect to the delay constraints) if one exists. We will also show in the sequel that implementations of the present inventive algorithm obtain paths of low weight.

Algorithm Description

In this section, we describe the algorithm that is run at each source. We first describe the algorithm for a particular destination. This algorithm is then used as a subroutine to compute short weight path to all the destinations from a given source.

Single Sink

Let s represent the source node. In this section, we determine a short weight path from s to a given destination node t. The processing of the algorithm at a node processor advantageously proceeds in two phases. Phase 1 of the algorithm involves running the well-known Dijkstra algorithm for paths from the destination to the source using the delay labels as the length of the arc. The distance labels (in delay) that result from the execution of Phase 1 are used in Phase 2 of the algorithm. We now give the algorithm for Phase 1.

PHASE 1(s, t, d)

INITIALIZATION $$U=V, W=\phi, \delta_t=0, \delta_j=\infty \; \forall j \neq t$$

ITERATIVE STEP $$k = \text{Arg min}_{j \in U} \delta_j$$

$$U = U \backslash \{k\} \text{ and } W = W \cup \{k\}.$$

For each j∈U, (j, k)∈E, if $\delta_k + d_{jk} < \delta_j$ then $\delta_j = \delta_k + d_{jk}$

TERMINATION TEST

Stop if s∈W.

Note that $\delta_j$ represents the shortest path length from node j to the destination t. If $\delta_s > D$ then there is no feasible solution to the problem and the algorithm terminates. If $\delta_s \leq D$, then Phase 2 of the algorithm, which is a modified version of Dijkstra's algorithm, is executed from the source s.

For the ease of the algorithm description, we define the generalized weight of an edge (i, j) as $$v_{ij} \triangleq (w_{ij}, d_{ij}) \qquad (1)$$

The generalized weight of a simple path P∈P(i, k) is defined as v(P)·(w(P), d(P)).

In Phase 2 the predecessor of each node is maintained in π[i], ∀i∈V, and a two-tuple label (ω, ψ) is maintained for each node, where ω is the accumulated weight from the source s along a feasible path and ψ is the delay from the source s along the same path. A lexicographic order is defined for these two-tuples, namely, Definition 1 Define $$(\omega_i, \psi_i) < (\omega_j, \psi_j)$$

if $$\omega_i < \omega_j, \text{ or}$$

$$\omega_i = \omega_j \text{ and } \psi_i < \psi_j$$

Phase 2 of the algorithm is:

PHASE 2 (s, t, w, d)

INITIALIZATION

1 U=V, W=∅, $\omega_s = \psi_s = 0$, $\omega_j = \psi_j = \infty$ ∀j≠s, π[j]=NULL ∀j∈V

ITERATIVE STEP 2 k=Arg $\min_{j \in U} (\omega_j, \psi_j)$

3 U=U\\{k} and W=W∪{k}.

4 4.1 For each j∈U, (k, j)∈E 4.2 if $(\omega_k + w_{kj}, \psi_k + d_{kj}) < (\omega_j, \psi_j)$ 4.3 if $(\psi_k + d_{kj} + \delta_j \leq D)$ 4.4 $\omega_j = \omega_k + w_{kj}$ 4.5 $\psi_j = \psi_k + d_{kj}$ 4.6 π[j]=k

TERMINATION TEST

5: Stop if t∈W.

Note that if line 4.3 is taken out, the above algorithm is just Dijkstra's algorithm with respect to the generalized weight v. In other words, it is Dijkstra's algorithm with respect to the weight with the delay label ψ used as the tie-breaker. Since all the arguments used in proving Dijkstra's algorithm still apply when we use the generalized weight v defined in 1, we have the following lemma.

Lemma 1 If we run Dijkstra's algorithm on G with respect to the generalized weight v, then at termination, $$(\omega_i, \psi_i) = \min_{P \in P(s,i)} v(P)$$

The following theorem summarizes the properties of our algorithm.

Theorem 2 Phase 2 terminates with a path that satisfies the delay constraint. In addition, if there are shortest paths with respect to weight that satisfy the delay constraint, the algorithm will find one.

Proof

First we show that when $\delta_s \leq D$, Phase 2 will find a path that satisfies the delay constraint.

From line 4.3 and 4.4, one can see that the weight label of a node i, $\omega_i$, assumes a finite value only when node i is on a feasible path (i.e., there is at least one path from i to t that satisfies the delay constraint). In addition, line 3 removes one element from set U in each iteration. Therefore, if the algorithm fails to find a feasible path, we must have $\omega_i = \infty$, $\forall i \in U$ at some point during the execution of the algorithm. This is not possible due to the following reason: Whenever a node is included in the set W there exists a path from the source to the destination through that node that satisfies the delay constraint. Since $s \in W$ and $t \in U$ (otherwise the algorithm has succeeded), $\exists k \in W, j \in U$, s.t. edge (k, j) is on a feasible path. When k was included in W the value of $w_j$ would have been updated to a finite value and hence a contradiction.

To prove the second statement of the theorem, first consider running Dijkstra's algorithm with respect to the generalized weight v. When it terminates with a simple path from s to t, denoted by $P^*(s,t)=(s,i_1, \ldots, i_{k^0}=t)$, each node on this path has a label $(\omega_{i^k}, \psi_{i^k})$, $k=1, \ldots, k_0$. We know from Lemma 1 that $P^*(s, t)$ is the shortest path with respect to weight among all the paths from s to t, and if there are more than one such shortest paths, $P^*(s,t)$ has the smallest delay among them. Therefore, if there are shortest paths with respect to weight that satisfy the delay constraint, $P^*(s, t)$ is one among them.

Let's assume for now that no other shortest path with respect to weight has the same delay as $P^*(s, t)$. We then use mathematical induction to prove that upon termination of Phase 2, a) the label for node $i_k$ on $P^*(s, t)$ is still $(\omega_{i^k}, \psi_{i^k})$; and b) the path from s to t will be found to be $P^*(s, t)$.

Since $P^*(s, t)$ is a feasible path, the condition on line 4.3 will be satisfied when are $(s, i_1)$ is explored. By Lemma 1, arc are $(s, i_1)$ has the smallest generalized weight $v_{si^1}$ among all the paths from s to $i_1$, so node $i_1$ will be permanently labeled as $((\omega_{i^1}, \psi_{i^1})=(\omega_{si^1}, d_{si^1}))$ and its predecessor will be s.

Note that it is possible that there are other paths from s to $i_1$ whose generalized weight is the same as $(w_{si^1}, d_{si^1})$, in which case node $i_1$ may be permanently labeled not from s but from the last node on one of these paths, say the last node of $P'(s, i_1)$. But since the value of the label for $i_1$ will be the same, and s will still be on the predecessor tree of $i_1$, possibly with some intermediate predecessor nodes, finding path $P'(s, i_1)$ is no different from finding $(s, i_1)$ as far as weight and delay are concerned. Therefore, we will ignore such cases without loss of generality in the rest of the proof.

Since node $i_1$ is directly connected to s, it acquires its permanent label when s is taken out of set U, which happens during the first iteration of the algorithm. Because the label values do not increase and $(\omega_{i^k}, \psi_{i^k}) \leq (\omega_{i^{k+1}}, \psi_{i^{k+1}})$ for $k=1, \ldots, k_0-1$, we know that if $(\omega_{i^1}, \psi_{i^1})<(\omega_{i^2}, \psi_{i^2})$ (or equivalently $(w_{i^1 i^2}, d_{i^1 i^2})>(0,0))$ then node $i_1$ will be removed from set U before $i_2, \ldots, i_{k^0}$. If $(\omega_{i^1}, \psi_{i^1})=(\omega_{i^2}, \psi_{i^2})$ (i.e. $(w_{i^1 i^2}, d_{i^1 i^2})=(0,0)$), then it is possible that $i_2$ is removed before $i_1$ from set U. But this simply means that we have found another path from s to $i_2$ with the same weight and delay as $P^*(S, i_2)=(s, i_1, i_2)$. Again, we don't distinguish such cases from that of $i_1$ being removed from set U before $i_2$, for these paths are equivalent as far as weight and delay are concerned. For the rest of the proof, we assume $(\omega_{i^k}, \psi_{i^k})<(\omega_{i^{k+1}}, \psi_{i^{k+1}})$ without loss of generality.

Assume for the purpose of induction that the nodes $i_1, \ldots, i_k$ have been moved to set W and permanently labeled as $(\omega_{i^1}, \psi_{i^1}), \ldots, (\omega_{i^k}, \psi_{i^k})$. Further assume that the path from s to $i_k$ is found to be $(s, i_1, \ldots, i_k)$ and $i_k$ is removed from set U before nodes $i_{k+1}, \ldots, i_{k^0}$. We now show that node $i_{k+1}$ will be the next on the path and will be labeled $(\omega_{i^{k+1}}, \psi_{i^{k+1}})$.

When node $i_k$ is removed from set U, arc $(i_k, i_{k+1})$ is explored. Since the path from s to $i_k$ is part of $P^*(s, t)$ and $i_{k+1}$ is on $P^*(s, t)$, condition on line 4.3 is satisfied. Hence $i_{k+1}$ will be labeled as $(\omega_{i^k}, \psi_{i^k})+(w_{i^k i^{k+1}}, d_{i^k i^{k+1}})=(\omega_{i^{k+1}}, \psi_{i^{k+1}})$, and its predecessor will be $i_k$. Because $(\psi_{i^{k+1}}, \psi_{i^{k+1}})$ is the smallest label by Lemma 1, node $i_{k+1}$ will not be relabeled. In addition, $i_{k+1}$ will be removed from set U before nodes $i_{k+2}, \ldots, i_{k^0}$ because it acquires its permanent label when node $i_k$ is removed from set U and this label is smaller than those of $i_{k+2}, \ldots, i_{k^0}$. This concludes our induction.

Finally, if there are other shortest paths with respect to weight that has the same delay as $P^*(s, t)$, then it is possible that such an alternative path is found instead of $P^*(s, t)$. But these paths are equivalent as far as weight and delay are concerned.

Multiple Sink Case

The objective in PNNI is to determine the shortest path from source s to all other nodes. This is done by executing Phase 1 and Phase 2 from the source to each sink. However, when the algorithm is executed to determine a short weight path from the source to the destination $t_1$, it might give information about short paths from the source to other destinations. In particular, for all destinations in the set F, the optimal solution to the constrained shortest path problem is known. This is exploited in the multiple sink case. The algorithm multiple sink is given below:

Multiple Destinations(s)

INITIALIZATION

G=V, F=∅M=∞.

ITERATIVE STEP

Pick t∈G

PHASE 1 (s, t, d)

PHASE 2 (s, t, w)

TERMINATION TEST

Stop if G∈∅ else go to the ITERATIVE STEP.

Figure 2:
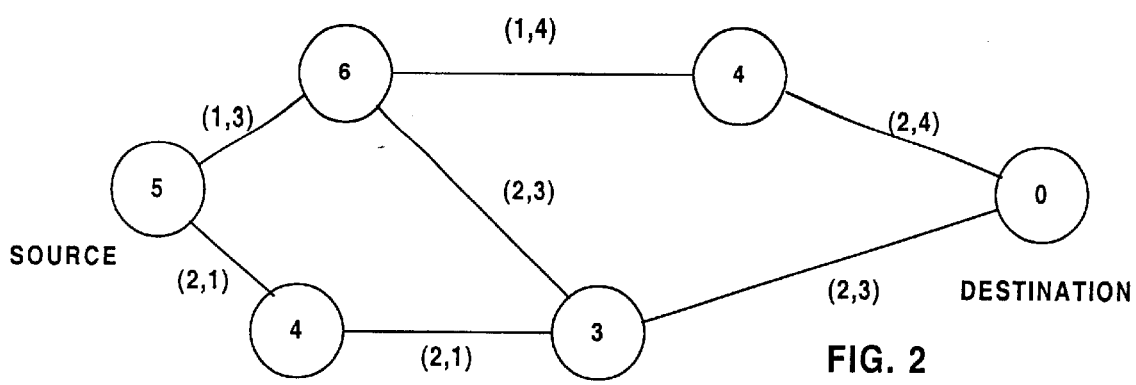
FIG. 2 is useful in understanding Phase 1 of an illustrative embodiment of the present invention as applied to the example network of FIG. 1.

Returning now to the example network of FIG. 1, we consider the application of phase 1 processing described above. As illustrated in FIG. 2, phase 1 comprises determining the smallest delay labels $(d_{j,k})$ for the delay from a node j to the destination k using the reverse Dijkstra SPF algorithm. It is assumed that the Source-to-Destination delay is constrained to be less than or equal to 10 units. The link parameters are presented as (link AW, link delay). So, for example, for the topmost path in FIG. 2, the link (AW, delay) tuple is (1,4).

Figure 3:
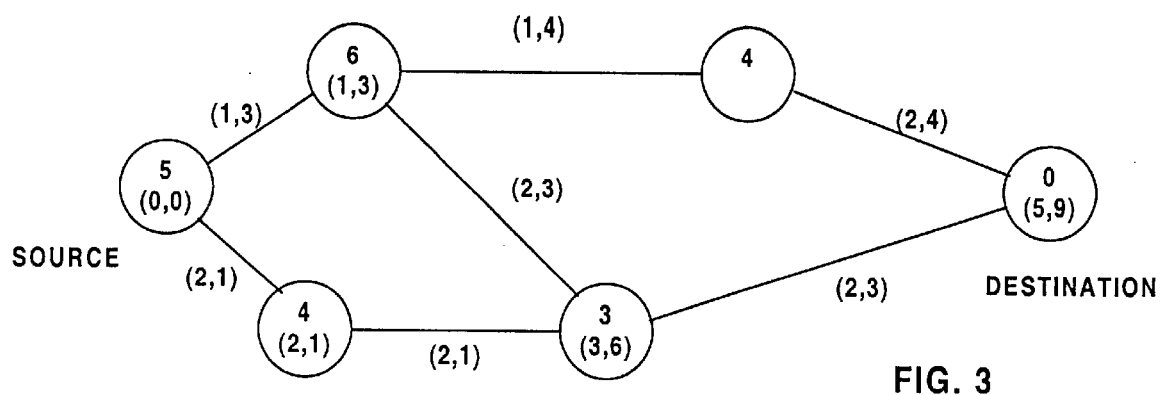
FIG. 3 is useful in understanding Phase 2 of an illustrative embodiment of the present invention as applied to the example network of FIG. 1.

In FIG. 3, the results of phase 1 processing are applied in phase 2 processing. In particular, we again run the Dijkstra SPF, this time from the source. AW is used as the link metric for the "shortest" path determination, but (i) each node is labeled with cumulative AW sum from the source, (ii) cumulative delay from the source ($D_{s,i}$) labels of a neighboring node j of a permanently labeled node i are updated only if ($D_{s,i}+d_{j,k}+\delta_{i,j}$) meets the end-to-end delay constraint (10, in this example). It becomes clear that the path along the upper periphery of the network representation would have a delay of 11, which exceeds the delay constraint. The path from the source through nodes 6 and 3, however, has a total path delay of 9. The tuple inside the node circles reflects the sums of link AW and the sums of link delay, respectively.

From the foregoing, it will be appreciated by those skilled in the art that currently available Dijkstra algorithm technology, including existing program code, can be adapted in accordance with the present inventive teachings to allow real-time routing at nodes of a data network in response to link data provided in the normal use of PNNI protocols.

In use of the present inventive methods and systems employing disclosed algorithms and methods, node processors or alternative processor facilities will find one or more feasible paths through a network that satisfy end-to-end delay constraints—if at least one such path exists.

If the AW shortest-path automatically satisfies the delay constraint, that path will advantageously be chosen using the present inventive teachings. While the above-described methods indicate the use of the Dijkstra algorithm n+1 times for the one-to-all shortest path solution, those skilled in the art will recognize that in appropriate circumstances the computational load can be reduced by exchanging delay-to-destination labels $d_{j,k}$ among nodes. While the present detailed description has proceeded in the context of PNNI protocols, the present invention will prove useful in a variety of network types using a variety of network protocols.

Other modifications and extensions, all within the spirit and scope of the attached claims, will occur to those skilled in the art in light of the present inventive teachings.

What is claimed is:

1. A method for choosing a path in a network from a source to a destination, the network comprising a plurality of nodes, each node connected to a plurality of other nodes by links, each link having a weights reflecting at least first and second link parameters, paths connecting said source and said destination comprising a plurality of links, said paths being subject to a constraint on the cumulative value of said second parameter for links in a path, the method comprising the steps of:

a. for paths from said destination to said source, performing a minimum-weight path identification based on said second parameter for paths in said network, thereby to generate labels identifying weights for said second parameter for each node j to destination k, b. for paths from said source to said destination performing a minimum-weight path identification from said source using said first parameter as a link metric, and c. eliminating any nodes that would cause the constraint on said cumulative value for said second parameter to be violated.

2. The method of claim 1 wherein said minimum-weight path identification for paths from said destination is accomplished using a Dijkstra SPF algorithm.

3. The method of claim 2 wherein said minimum-weight path identification for paths from said source is accomplished using a Dijkstra SPF algorithm.

4. The method of claim 3 wherein the method further comprises repeating steps a, b and c for paths between said source node and each possible destination node in said network.

5. The method of claim 4 wherein for destination nodes after a first destination node, path information from said source to one or more other destinations is used in determining acceptable paths to each said nodes after said first destination.

6. The method of claim 1 wherein said step of performing a minimum-weight path identification from said source comprises (i) labeling a node i with cumulative AW from the source node, and (ii) tracking cumulative delay ($D_{s,i}$) from the source based on values for said second parameter during said minimum-weight path identification from said destination.

7. The method of claim 6 wherein said step of eliminating comprises labeling neighboring nodes j of a permanently labeled node i only if ($D_{s,i}+d_{j,k}+\delta_{i,j}$) is less than the specified end-to-end constraint on said second parameter, where $\delta_{i,j}$ is the value of said second parameter for the link between nodes i and j, and $d_{j,k}$ is the value for said second parameter for the link between nodes j and k.

8. The method of claim 7 wherein said second parameter is link delay.

9. The method of claim 6 wherein said second parameter is link delay.

10. The method of claim 1 wherein operation of said network is in accordance with PNNI protocols.

11. The method of claim 10 wherein said second parameter is link delay.

12. The method of claim 1 wherein said first parameter is administrative weight (AW).

13. The method of claim 1 comprising the further step of eliminating any paths in said minimum-weight path identification for paths from said source for which the cumulative value for said first parameter exceeds a predetermined maximum.

* * * * *